United States Patent
Lee et al.

(10) Patent No.: US 7,053,966 B2
(45) Date of Patent: May 30, 2006

(54) ADJUSTING CONVERGENCE APPARATUS AND METHOD

(75) Inventors: Joon-hwan Lee, Gunpo-si (KR); Jae-seung Shim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 541 days.

(21) Appl. No.: 10/287,776

(22) Filed: Nov. 5, 2002

(65) Prior Publication Data

US 2003/0086025 A1 May 8, 2003

(30) Foreign Application Priority Data

Nov. 8, 2001 (KR) ............................ 2001-69497

(51) Int. Cl.
  *H04N 3/22* (2006.01)
  *H04N 3/26* (2006.01)

(52) U.S. Cl. ................ 348/745; 348/747; 348/806; 315/368.13

(58) Field of Classification Search ........... 348/806, 348/807, 745, 746, 744; 315/368.13, 368.11, 315/368.12, 308; H04N 3/22, 3/26
See application file for complete search history.

(56) References Cited

U.S. PATENT DOCUMENTS

| | | | |
|---|---|---|---|
| 5,497,054 A * | 3/1996 | Ryu | 315/368.11 |
| 5,694,181 A * | 12/1997 | Oh | 348/807 |
| 5,790,210 A * | 8/1998 | Kim et al. | 348/807 |
| 6,373,535 B1 * | 4/2002 | Shim et al. | 348/745 |
| 6,483,262 B1 * | 11/2002 | Shim | 315/368.13 |

FOREIGN PATENT DOCUMENTS

JP  2001-86527 A  3/2001

* cited by examiner

*Primary Examiner*—John Miller
*Assistant Examiner*—Trang U. Tran
(74) *Attorney, Agent, or Firm*—Sughrue Mion, PLLC (57) ABSTRACT

Disclosed is a projection image display apparatus, specified in a convergence adjusting apparatus employing a spline interpolation scheme. In the projection image display apparatus, the convergence adjusting apparatus includes controller for selecting sections arranged between seeds of convergence adjustment among a plurality of horizontal and vertical lines and for interpolating first through fourth position coefficients of control seeds assigned to the selected section, a position coordinate generator for performing operations on the number of the horizontal lines and its squared and cubed values by counting horizontal synchronization signals and generating the same, a multiplier for multiplying the horizontal line number output from the position coordinate generator and its squared and cubed values by each of the first through fourth position coefficients output from the controller, and an adder for summing the first position coefficient output from the controller and an output of the multiplier to generate values of the sections interpolated.

8 Claims, 7 Drawing Sheets

ADJUSTING CONVERGENCE APPARATUS AND METHOD

BACKGROUND OF THE INVENTION

1. Field of the Invention

The present invention relates to spline interpolation for a projection image display apparatus, and more particularly, to a convergence adjusting apparatus and method for adjusting convergence using selective spline interpolation.

2. Description of the Related Art

With increasing demands for larger image display apparatuses, as well as higher image quality apparatuses, projection-type image display apparatuses have been proposed for attaining large-screen display. In particular, a technique for adjusting convergence is an important factor that mostly influences image quality and productivity of a projection television.

A projection television has three independent cathode ray tubes (CRTs), i.e., red (R), green (G), and blue (B), unlike a general direct-view television. Therefore, in order to form an image from the R/G/B CRTs, it is necessary to control convergence for making focuses of the R/G/B beams to coincide with one another. One method of adjusting the convergence is to use forty seed points that are arranged on a seed matrix of eight horizontal seeds and five vertical seeds. The sections between the seed points are associated with curves set by sequential spline interpolation. However, according to the conventional scheme of the sequential spline interpolation, curves symmetrical left and right cannot be obtained under the condition in which operations are performed with respect to seed points closest to a convergence controlled seed point.

Figure 1:
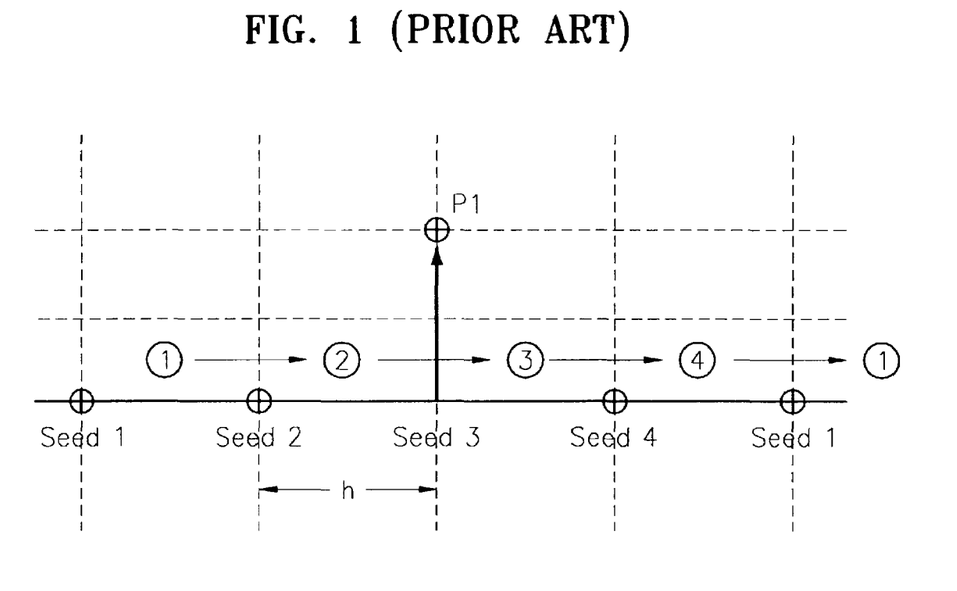
FIGS. 1 and 2 illustrate a conventional spline interpolation using a sequential operation scheme.
Figure 2:
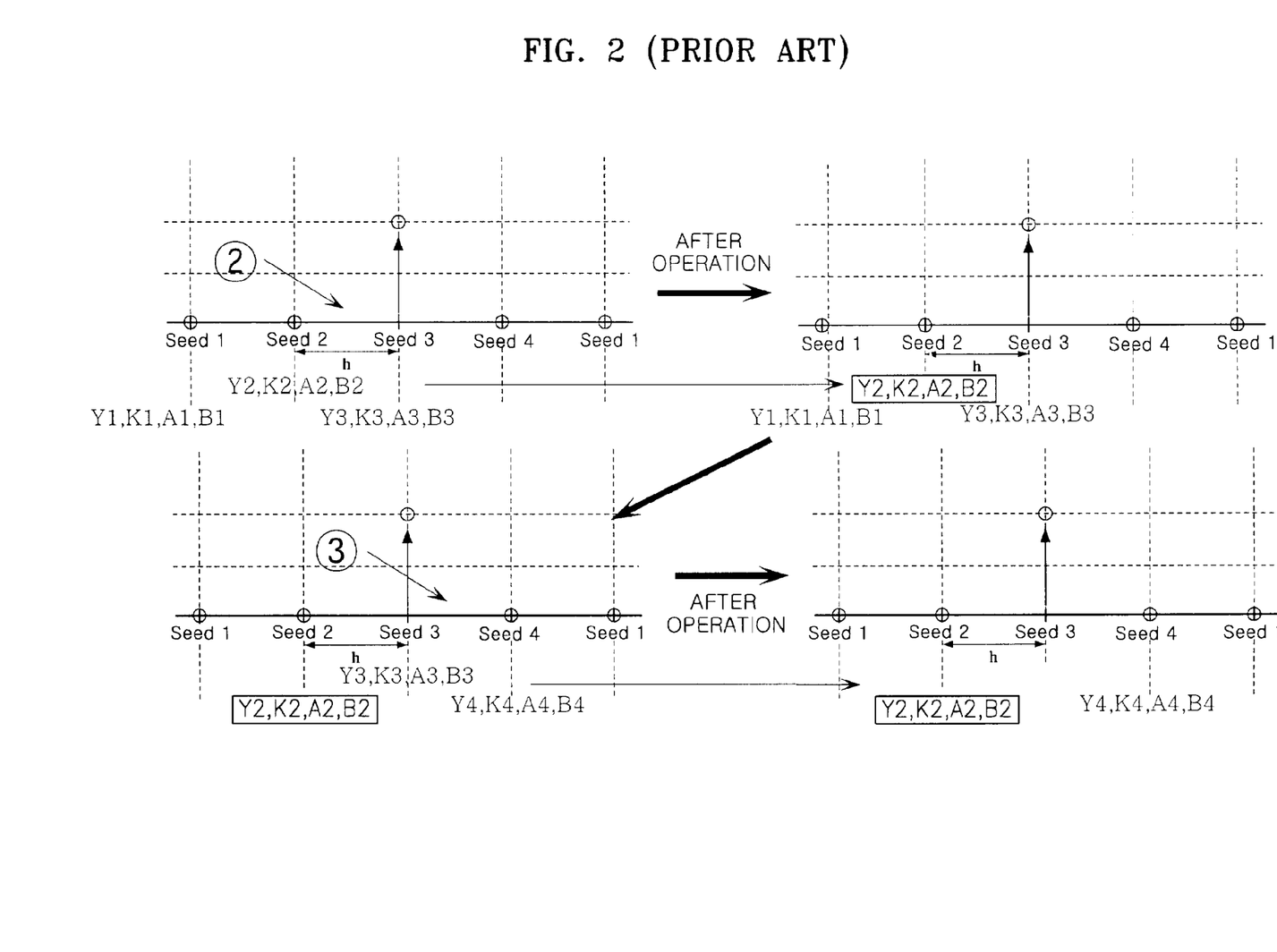

Referring to FIGS. 1 and 2 showing a conventional spline interpolation scheme employing a sequential operation method, a three-dimensional equation, $f(x)=Y+KX+AX^2+BX^3$ is obtained using two seed points, and a relatively gentle curve is set between the two seed points. In obtaining the three-dimensional equation, parameters X and Y are predetermined positional coordinate values, and K is a differential value at the coordinate seed X, i.e., a slope of the curve. Thus, it is possible to obtain the respective coefficients and to plot curves between each of seed points shown in FIG. 1.

According to the conventional spline interpolation scheme employing a sequential operation method, as shown in FIG. 1, if a value of Seed 3 moves up to a seed point P1, a sequential operation is conducted using spline interpolation. First, in a section ①, a slope at Seed 1 is calculated using the coordinate values of Seed 1 and Seed 2, and coefficients K1, Y1, A1, and B1 are obtained from the three-dimensional equation. Also, in a section ②, a slope at Seed 2 is established using the coordinate values of Seed 2 and Seed 3, and coefficients K2, Y2, A2, and B2, which are coefficients at Seed 2, are set, accordingly. In such a manner, sequential operations are carried out in the sections ① through ④.

On the other hand, in the case of performing a sequential operation as shown in FIG. 2, during a spline interpolation for Seed 2 in the section ②, Seed 1 and Seed 3 are employed in establishing the three-dimensional equation passing through Seed 2. After the spline operation, the slope at Seed 2, K2, and three coefficients, Y2, A2, and B2, are different from the previous values. Thereafter, a spline operation for Seed 3 in a section ③ is associated with the coefficients of Seed 2 that are the changed values of K2, Y2, A2 and B2 and coefficients of Seed 4, K4, Y4, A4, and B4.

However, such a sequential operation may cause errors in convergence adjustment because it results in an asymmetrical curve to the left and right due to different seed values between the left and right sides of an operated seed.

SUMMARY OF THE INVENTION

To solve the above-described problems, it is an aspect of the present invention to provide a selective spline interpolation device and method for obtaining an interpolation curve that is symmetrical left and right by solving an asymmetry problem between the left and right sides of a curve, the problem which may be generated in the case of employing sequential spline interpolation between seed points.

It is another aspect of the present invention to provide a convergence adjusting apparatus and method for reducing errors in convergence adjustment by rendering an interpolation curve to be symmetrical left and right using a selective interpolation scheme.

In an aspect of the present invention, a spline interpolation device including a controller for selecting sections arranged between control seeds for spline interpolation among a plurality of horizontal and vertical lines in a specific order and for interpolating first through fourth position coefficients of control seeds assigned to the selected sections and generating the interpolation results, a position coordinate generator for performing operations on the number of the horizontal lines of control seeds and its squared and cubed values and generating the operation results, a multiplier for multiplying the horizontal line number output from the position coordinate generator and its squared and cubed values by the second through fourth position coefficients output from the controller, respectively, and an adder for summing the first position coefficient output from controller and an output of the multiplier to generate values of the sections interpolated.

According to another aspect of the present invention, there is also provided a spline interpolation method including (a) setting a first reference seed among convergence control seeds and interpolating position coefficients of the first reference seed and position coefficients of seeds closest to the first reference seed to plot a curve passing through the first reference seed, (b) selecting seeds spaced from the first reference seed by two seed pitches as second reference seeds and interpolating spline coefficients of the second reference seeds and seeds closest to the second reference seeds to plot curves passing through the second reference seeds, and (c) interpolating spline coefficients of the first closest seed of the first reference seed and the interpolated spline coefficients of the first and second reference seeds to plot a curve passing through the first closest seed, and interpolating position coefficients of the second closest seed of the first reference seed and position coefficients of the first and second reference seeds to plot a curve passing through the second closest seed, whereby curves obtained from steps (a), (b) and (c) are symmetrical with respect to the first reference seed.

In still another aspect of the present invention, a convergence adjusting apparatus in a projection image display apparatus, the convergence adjusting apparatus including a controller for selecting sections arranged between seeds of convergence adjustment among a plurality of horizontal and vertical lines and for interpolating first through fourth position coefficients of control seeds assigned to the selected section, a position coordinate generator for performing operations on the number of the horizontal lines and its squared and cubed values by counting horizontal synchronization signals and generating the same, a multiplier for multiplying the horizontal line number output from the position coordinate generator and its squared and cubed values by each of the first through fourth position coefficients output from the controller, and an adder for summing the first position coefficient output from the controller and an output of the multiplier to generate values of the sections interpolated.

Alternatively, the present invention provides a convergence adjusting method including (a) setting a first reference seed among convergence control seeds and interpolating position coefficients of the first reference seed and position coefficients of seeds closest to the first reference seed to plot a curve passing through the first reference seed, (b) selecting seeds spaced from the first reference seed by two seed pitches as second reference seeds and interpolating spline coefficients of the second reference seeds and seeds closest to the second reference seeds to plot curves passing through the second reference seeds, and (c) interpolating position coefficients of the first closest seed among seeds closest to the first reference seed and position coefficients of the first and second reference seeds to plot a curve passing through the first closest seed, and interpolating the second closest seed among seeds closest to the first reference seed and position coefficients of the first and second reference seeds to plot a curve passing through the second closest seed.

BRIEF DESCRIPTION OF THE DRAWINGS

The above objects and advantages of the present invention will become more apparent by describing in detail the preferred embodiments thereof with reference to the attached drawings in which.

DETAILED DESCRIPTION OF THE INVENTION

Hereinafter, preferred embodiments of the present invention will be described in detail hereinafter in conjunction with the accompanying drawings.

Figure 3:
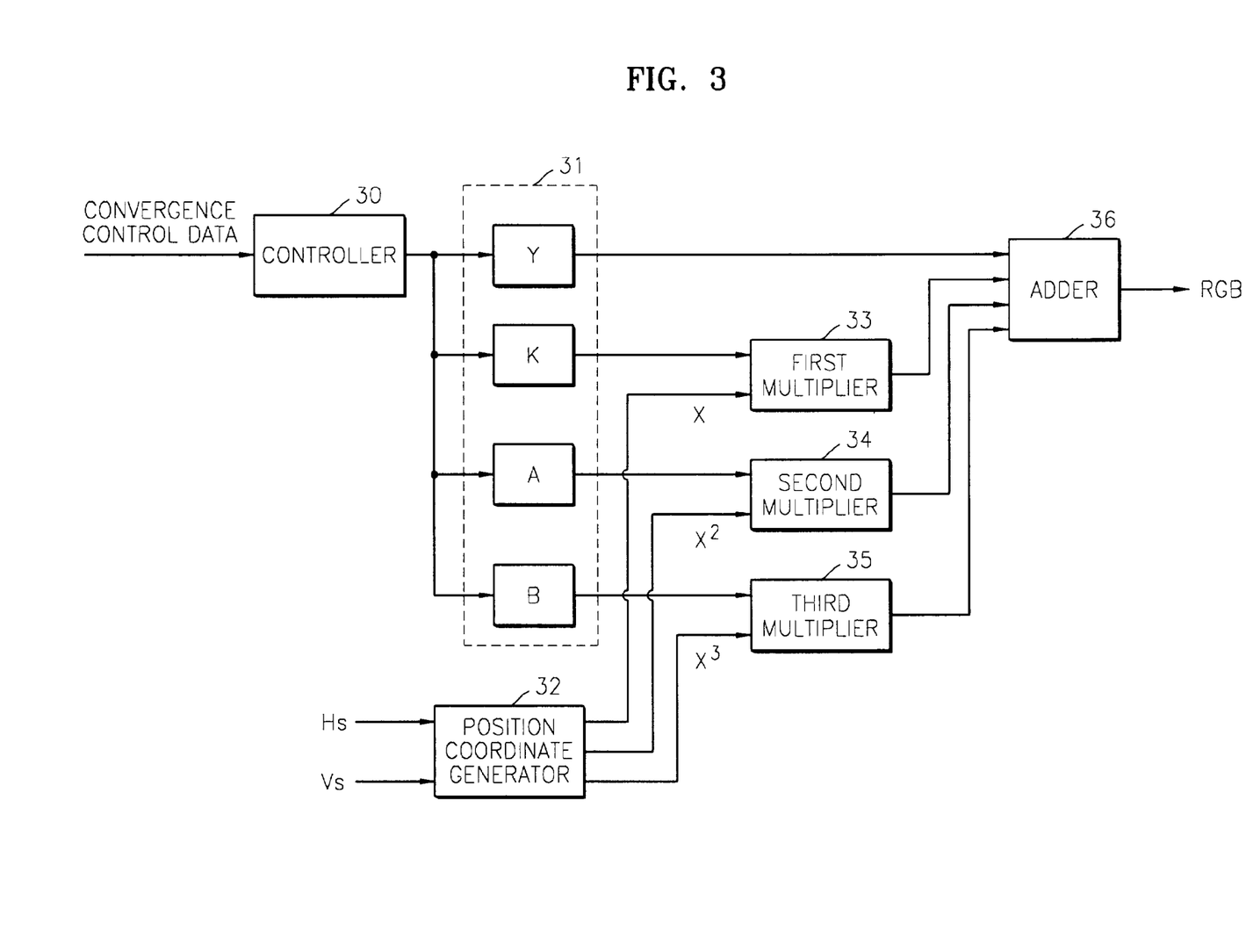
FIG. 3 is a block diagram of a convergence adjusting apparatus for spline interpolation using a selective operation scheme according to the present invention.

FIG. 3 shows a structure of a convergence adjusting apparatus using a selective spline interpolation scheme according to the present invention. The convergence adjusting apparatus includes a controller 30, a memory 31, a position coordinate generator 32, a first multiplier 33, a second multiplier 34, a third multiplier 35 and an adder 36.

Figure 4:
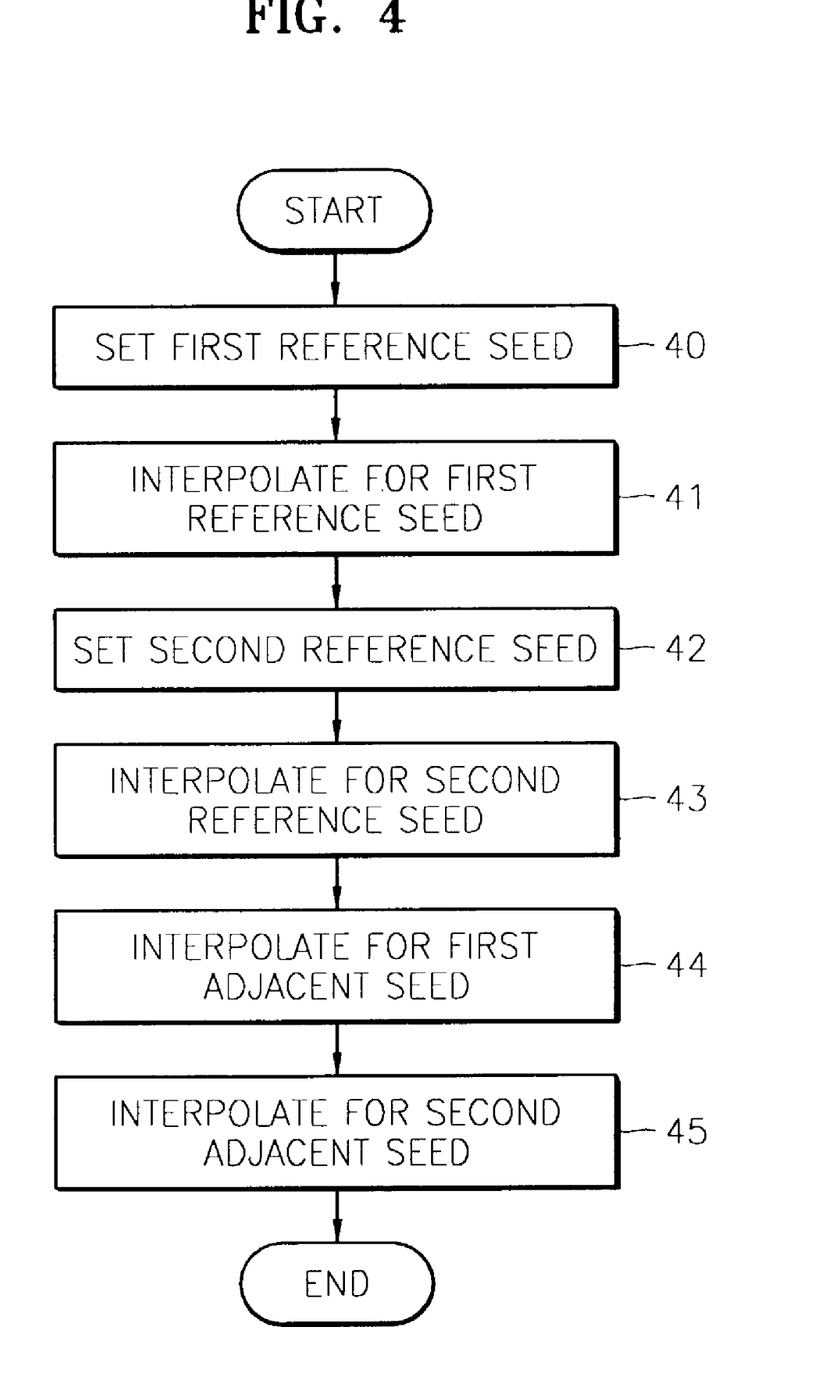
FIG. 4 is a flow diagram showing a sequence of convergence adjustment for spline interpolation using a selective operation scheme according to the present invention.

FIG. 4 is a flow diagram illustrating a sequence of spline interpolation using a selective operation scheme according to the present invention. The sequence includes setting a first reference seed among convergence control seeds (step 40), interpolating spline coefficients of the first reference seed and spline coefficients of seeds closest to the first reference seed (step 41), selecting seeds spaced from the first reference seed by two seed pitches as a second reference seed (step 42), interpolating spline coefficients of the second reference seed and spline coefficient of seeds closest to the second reference seed (step 43), interpolating spline coefficients of the first closest seed of the first reference seed and the interpolated spline coefficients of first and second seeds (step 44), and interpolating spline coefficients of the second closest seed of the first reference seed and the interpolated spline coefficients of the first and second seeds (step 45).

Figure 5:
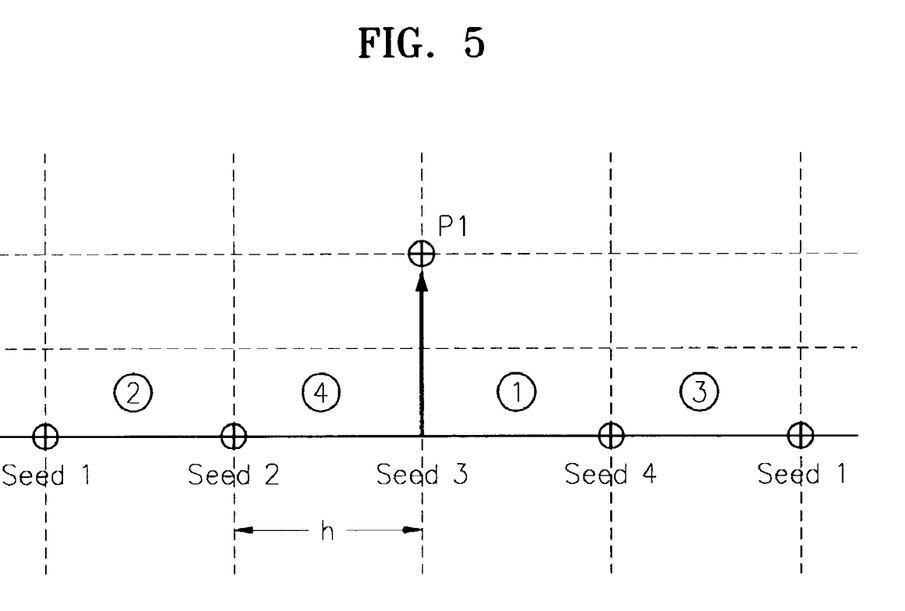
FIGS. 5 and 6 are detailed flow diagram illustrating the sequence of convergence adjustment shown in FIG. 4.
Figure 6:
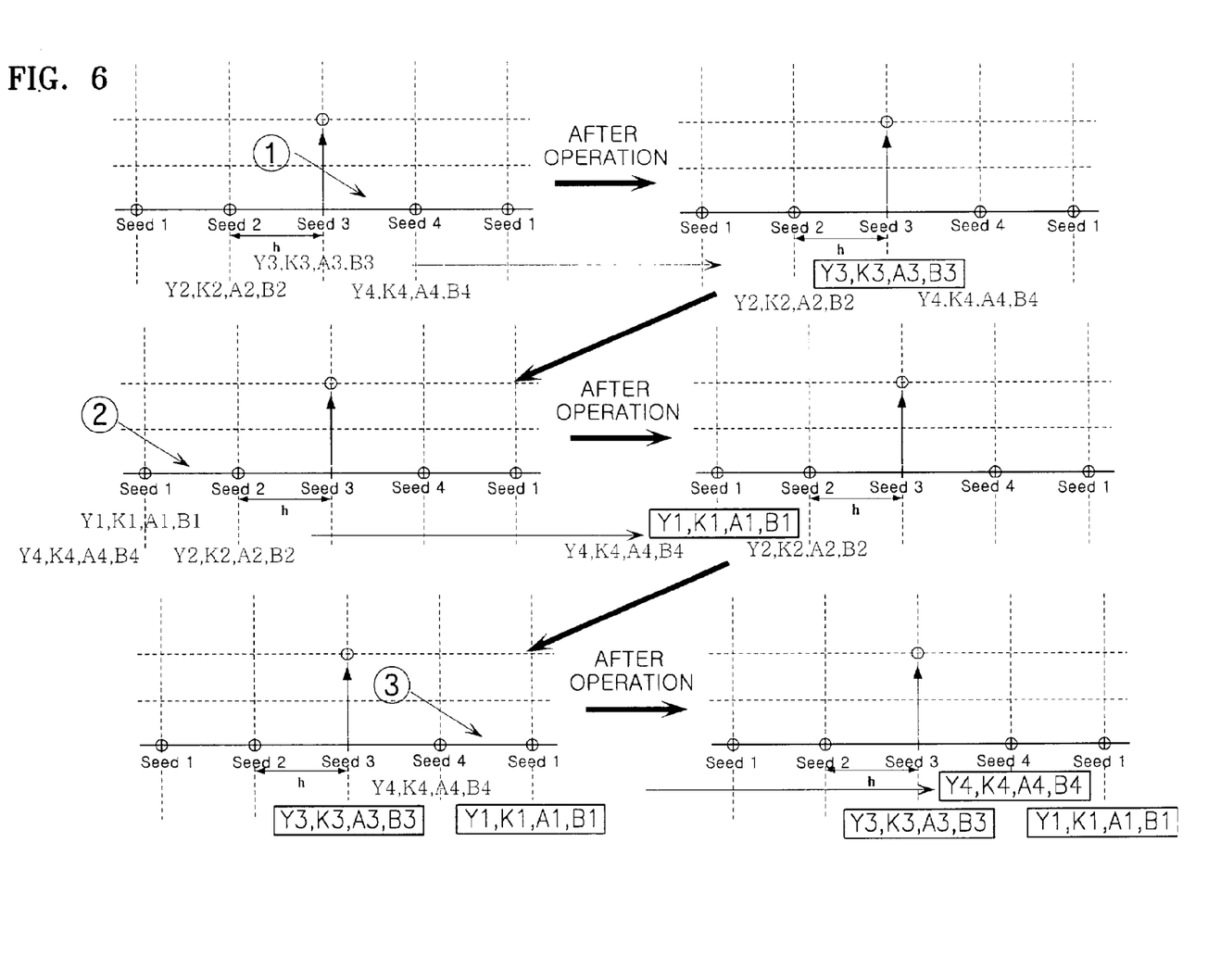

FIGS. 5 and 6 are detailed flow diagrams showing a procedure of the convergence adjustment shown in FIG. 4.

Figure 7A:
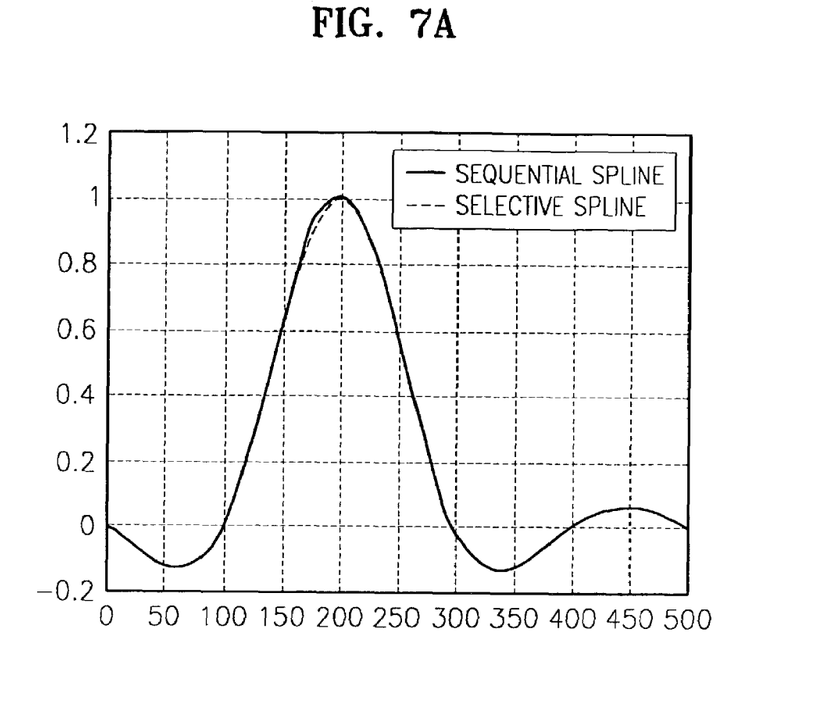
FIGS. 7A and 7B are graphic representations of spline interpolation characteristics using the sequential and selective operation schemes, respectively.
Figure 7B:
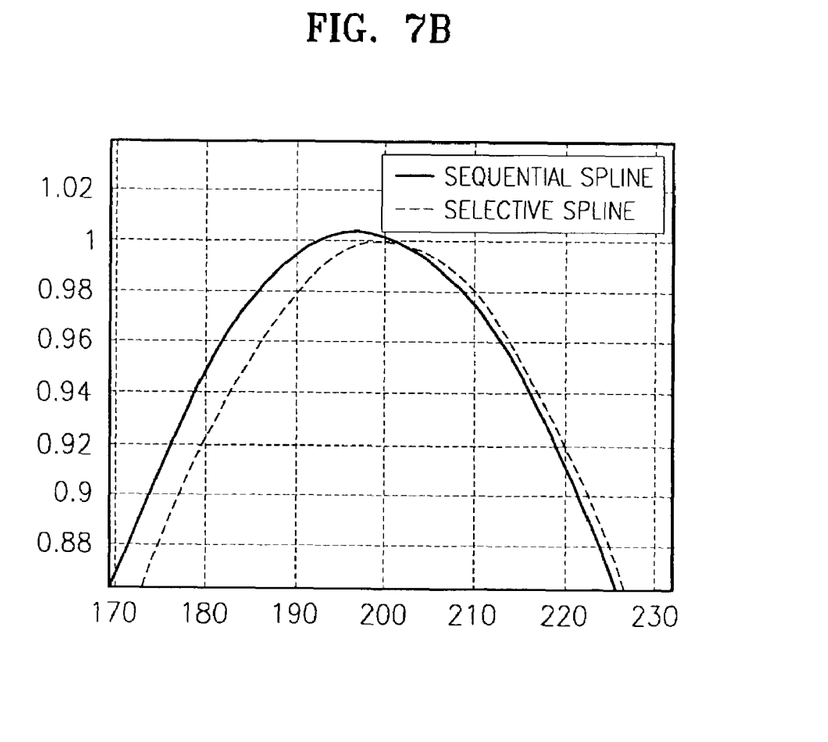

FIGS. 7A and 7B comparatively show graphic characteristics resulting from the sequential and selective spline interpolation schemes, respectively.

The present invention will be described in more detail hereinafter with reference to FIGS. 3 through 7B.

The controller 30 selects sections, which are defined between seed points for convergence adjustment among horizontal and vertical lines, in a specific order, and interpolates unknown coefficients, Y, K, A, and B, of the three-dimensional equation for the convergence control seeds belonging to the selected sections. The values of the interpolated coefficients are stored in the memory 31.

The controller 30 determines an operation method in the sequence shown in FIG. 4. The controller 30 sets Seed 3 as the first reference seed point (section ① in FIG. 5), and then sets Seed 1, which is spaced from Seed 3 by two seed pitches, as the second seed point (section ② in FIG. 5). Next, the controller 30 sets Seed 4 as one of the closest seeds to the first reference seed, i.e., Seed 3, (section ③ in FIG. 5), and sets Seed 2 as the other of the closest seeds to the first reference seed, i.e., Seed 3, (section ④ in FIG. 5). After determining the order of the respective seeds, the controller 30 interpolates unknown coefficients of the spline interpolation equation and stores the same in the memory 31.

The position coordinate generator 32 outputs the number of the horizontal lines by counting horizontal synchronization signals Hs and generates the square and cubed values of the horizontal line number. The position coordinate generator 32 is reset in response to vertical synchronization signals Vs. The first through third multipliers 33, 34 and 35 multiply the values output from the position coordinate generator 32, that is, the horizontal line number and its squared and cubed values, respectively, by the unknown coefficients K, A, and B stored in the memory 31, and the multiplied results are applied to the adder 36.

The adder 36 sums the unknown coefficient Y stored in the memory 31 and the outputs of the multipliers 33, 34, and 35. The adder 36 generates interpolation values for the sections ①~④ between each of the convergence control seeds based on the three-dimensional spline interpolation equation. The interpolation values are configured to be a symmetrical with respect to the first reference point Seed 3. With reference to the interpolation values, the current flowing to the deflecting coils of R/G/B CRTs is controlled, thereby achieving convergence adjustment.

Referring back to FIG. 4, the first reference seed is selected among the convergence control seeds and then interpolation is conducted for the spline coefficients of the first reference seed and the seeds closest to the first reference seed (steps 40–41).

Referring to FIG. 6, Seed 3 is selected as the first reference seed among the convergence control seeds; an operation is performed on a three-dimensional spline equation passing through the first reference seed. Spline interpolation at Seed 3 will now be briefly described. Seed 2 and Seed 4 are used as operands in obtaining the three-dimensional spline equation passing through Seed 3. After the operation, the slope K3 at Seed 3 and other coefficients Y3, A3, and B3 are different from their previous values.

Next, the second reference seed is assigned to seeds spaced from the first reference seed by two seed pitches, and interpolation is then carried out on the spline coefficients of the second reference seeds and the spline coefficients of the seeds closest to the second reference seeds (steps 42–43).

As shown in FIG. 6, Seed 1 is assigned to the second reference seed that is apart from the first reference Seed 3 by two seed pitches. Spline interpolation at the second reference Seed 1 uses Seed 2 and Seed 4 to obtain the three-dimensional spline equation. After the spline operation, the slope K1 of Seed 1 and other coefficients Y1, A1, and B1 are different from their previous values.

In step 44, the spline coefficients of the seed first closest to the first reference seed and the interpolated coefficients of the first and second seeds are interpolated.

In FIG. 6, Seed 4 is assigned to one of the seeds closest to the first reference seed. Spline interpolation at Seed 4 will briefly be described. Here, Seed 1 and Seed 3 are used in obtaining three-dimensional spline equations passing through Seed 4. At this time, unlike in the conventional sequential scheme, Seed 1 and Seed 3, which are previously operated values, contribute to plot a curve whose left and right sides are symmetrical with respect to the first reference seed, Seed 3, even under the condition of spline interpolation. After the spline operation, the slope K4 at Seed 4 and other coefficients Y4, A4, and B4, become different from their previous values.

In step 45, spline coefficients of the second closest seed of the first reference seed and the interpolated spline coefficients of the first and second seeds are interpolated.

Referring to FIG. 6, Spline interpolation at Seed 2, which is the other (or the second) closest seed to the first reference seed, will briefly be described. Here, Seed 1 and Seed 3 are used in obtaining three-dimensional spline equations passing through Seed 2. At this time, unlike in the conventional sequential scheme, Seed 1 and Seed 3, which are previously operated values, contribute to plot a curve whose left and right sides are symmetrical with respect to the first reference seed, Seed 3, even under the condition of spline interpolation. After the spline operation, the slope K2 at Seed 2 and other coefficients Y2, A2, and B2, become different from their previous values.

FIGS. 7A and 7B are graphical representations for comparison between the present scheme, i.e., the selective spline interpolation, and the conventional scheme, i.e., the sequential spline interpolation. Referring thereto, in the case of selective spline interpolation, a curve whose left and right sides are symmetrical is plotted with respect to the control seed, compared to sequential spline interpolation.

It may be possible to use the present invention in a selective spline interpolation for a general numerical analysis, as well as the convergence adjustment.

As described above, according to the present invention, image quality in a large-scale projection image display apparatus can be enhanced, by preventing asymmetrical plotting for the spline interpolation curve. Therefore, errors in adjusting convergence are reduced and accuracy of the convergence in projection televisions can be increased.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A spline interpolation device comprising:
a controller for selecting sections arranged between control seeds for spline interpolation among a plurality of horizontal and vertical lines in a specific order and for interpolating first through fourth position coefficients of control seeds assigned to the selected sections and generating the interpolation results;
a position coordinate generator for performing operations on a number of the horizontal lines of control seeds and its squared and cubed values and generating the operation results;
a multiplier for multiplying the horizontal line number output from the position coordinate generator and its squared and cubed values by the second through fourth position coefficients output from the controller, respectively; and
an adder for summing the first position coefficient output from controller and an output of the multiplier to generate values of the sections interpolated,
wherein the controller selects a first reference seed among the control seeds, selects a second reference seed with seeds spaced from the first reference seed by two seed pitches, and generates position coefficients by interpolating in the order of a first closest seed and a second closest seed that are the closest to the first reference seed.

2. A spline interpolation device comprising:
a controller for selecting sections arranged between control seeds for spline interpolation among a plurality of horizontal and vertical lines in a specific order and for interpolating first through fourth position coefficients of control seeds assigned to the selected sections and generating the interpolation results;
a position coordinate generator for performing operations on a number of the horizontal lines of control seeds and its squared and cubed values and generating the operation results;
a multiplier for multiplying the horizontal line number output from the position coordinate generator and its squared and cubed values by the second through fourth position coefficients output from the controller, respectively; and
an adder for summing the first position coefficient output from controller and an output of the multiplier to generate values of the sections interpolated, wherein the values generated from the adder are symmetrical with respect to a first reference seed.

3. A spline interpolation method comprising:
(a) setting a first reference seed among convergence control seeds and interpolating position coefficients of the first reference seed and position coefficients of seeds closest to the first reference seed to plot a curve passing through the first reference seed;
(b) selecting seeds spaced from the first reference seed by two seed pitches as second reference seeds and interpolating spline coefficients of the second reference seeds and seeds closest to the second reference seeds to plot curves passing through the second reference seeds; and
(c) interpolating spline coefficients of the first closest seed of the first reference seed and the interpolated spline coefficients of the first and second reference seeds to plot a curve passing through the first closest seed, and interpolating position coefficients of the second closest seed of the first reference seed and position coefficients of the first and second reference seeds to plot a curve passing through the second closest seed;

whereby curves obtained from steps (a), (b) and (c) are symmetrical with respect to the first reference seed.

4. A convergence adjusting apparatus in an image display apparatus, the convergence adjusting apparatus comprising:
 a controller for selecting sections arranged between seeds of convergence adjustment among a plurality of horizontal and vertical lines and for interpolating first through fourth position coefficients of control seeds assigned to the selected section;
 a position coordinate generator for performing operations on a number of the horizontal lines and its squared and cubed values by counting horizontal synchronization signals and generating the same;
 a multiplier for multiplying the horizontal line number output from the position coordinate generator and its squared and cubed values by each of the first through fourth position coefficients output from the controller; and
 an adder for summing the first position coefficient output from the controller and an output of the multiplier to generate values of the sections interpolated,
 wherein the controller selects a first reference seed among the control seeds, selects a second reference seed with seeds spaced from the first reference seed by two seed pitches, and generates position coefficients by interpolating in order of a first closest seed and a second closest seed that are the closest to the first reference seed.

5. The convergence adjusting apparatus as claimed in claim 4, wherein the position coordinate generator is counted and reset by vertical synchronization signals.

6. A convergence adjusting apparatus in an image display apparatus, the convergence adjusting apparatus comprising:
 a controller for selecting sections arranged between seeds of convergence adjustment among a plurality of horizontal and vertical lines and for interpolating first through fourth position coefficients of control seeds assigned to the selected section;
 a position coordinate generator for performing operations on a number of the horizontal lines and its squared and cubed values by counting horizontal synchronization signals and generating the same;
 a multiplier for multiplying the horizontal line number output from the position coordinate generator and its squared and cubed values by each of the first through fourth position coefficients output from the controller; and
 an adder for summing the first position coefficient output from the controller and an output of the multiplier to generate values of the sections interpolated, wherein the values generated from the adder are symmetrical with respect to a first reference seed.

7. An convergence adjusting method in displaying an image, the method comprising:
 (a) setting a first reference seed among convergence control seeds and interpolating position coefficients of the first reference seed and position coefficients of seeds closest to the first reference seed to plot a curve passing through the first reference seed;
 (b) selecting seeds spaced from the first reference seed by two seed pitches as second reference seeds and interpolating spline coefficients of the second reference seeds and seeds closest to the second reference seeds to plot curves passing through the second reference seeds; and
 (c) interpolating position coefficients of the first closest seed among seeds closest to the first reference seed and position coefficients of the first and second reference seeds to plot a curve passing through the first closest seed, and interpolating the second closest seed among seeds closest to the first reference seed and position coefficients of the first and second reference seeds to plot a curve passing through the second closest seed.

8. The method as claimed in claim 7, whereby curves obtained from the steps are symmetrical to the first reference seed.

* * * * *